United States Patent
Pinel et al.

(10) Patent No.: US 9,599,273 B2
(45) Date of Patent: Mar. 21, 2017

(54) PROCESS FOR COATING A THREADED TUBULAR COMPONENT, THREADED TUBULAR COMPONENT AND RESULTING CONNECTION

(75) Inventors: Eliette Pinel, Sainte-Euphémie (FR); Eric Gard, Genay (FR); Mikael Petit, Villefranche-sur-Saône (FR); Mohamed Gouider, Caluire-et-Cuire (FR)

(73) Assignees: VALLOUREC OIL AND GAS FRANCE, Aulnoye-Aymeries (FR); NIPPON STEEL & SUMITOMO METAL CORPORATION, Tokyo (JP)

( * ) Notice: Subject to any disclaimer, the term of this patent is extended or adjusted under 35 U.S.C. 154(b) by 833 days.

(21) Appl. No.: 13/977,238

(22) PCT Filed: Dec. 12, 2011

(86) PCT No.: PCT/EP2011/006258
§ 371 (c)(1),
(2), (4) Date: Sep. 4, 2013

(87) PCT Pub. No.: WO2012/089304
PCT Pub. Date: Jul. 5, 2012

(65) Prior Publication Data
US 2013/0333790 A1    Dec. 19, 2013

(30) Foreign Application Priority Data
Dec. 29, 2010    (FR) ...................................... 10 05156

(51) Int. Cl.
*F16L 15/00* (2006.01)
*F16L 58/10* (2006.01)
(Continued)

(52) U.S. Cl.
CPC ............ *F16L 58/1009* (2013.01); *B05D 1/02* (2013.01); *B05D 3/0254* (2013.01); *C08G 18/10* (2013.01);
(Continued)

(58) Field of Classification Search
CPC ....... F16L 15/00; F16L 15/001; F16L 15/003; F16L 15/004; F16L 15/08; F16L 58/10;
(Continued)

(56) References Cited

U.S. PATENT DOCUMENTS 4,166,149 A * 8/1979 Muller .............. B32B 17/10036
428/332
5,154,839 A    10/1992 Hanano
(Continued)

FOREIGN PATENT DOCUMENTS

CN    102713394 A    10/2012
FR    2 557 953    7/1985
(Continued)

OTHER PUBLICATIONS

U.S. Appl. No. 14/427,370, filed Mar. 11, 2015, Gouider, et al.
(Continued)

*Primary Examiner* — Walter B Aughenbaugh
(74) *Attorney, Agent, or Firm* — Oblon, McClelland, Maier & Neustadt, L.L.P.

(57) ABSTRACT

The invention concerns a threaded tubular component for drilling or working hydrocarbon wells, said tubular component having at one of its ends (1; 2) a threaded zone (3; 4) produced on its outer or inner peripheral surface depending on whether the threaded end is male or female in type, in which at least a portion of the end (1; 2) is coated with at least one film of polyurethane (12), 100% solid state, with an essentially rigid structure, based on a matrix of polyurethane and polyurea, in which the urethane functionality is pre- (Continued)

dominant with respect to the urea functionality in a proportion of at least 55% by weight.

22 Claims, 3 Drawing Sheets

(51) Int. Cl.

| | | |
|---|---|---|
| *F16L 15/08* | (2006.01) | |
| *B05D 3/02* | (2006.01) | |
| *C09D 175/02* | (2006.01) | |
| *B05D 1/02* | (2006.01) | |
| *C08G 18/10* | (2006.01) | |
| *C08G 18/38* | (2006.01) | |
| *C08G 18/62* | (2006.01) | |
| *C08G 18/66* | (2006.01) | |
| *C09D 175/04* | (2006.01) | |
| *C10M 107/44* | (2006.01) | |
| *E21B 17/042* | (2006.01) | |
| *F16L 58/18* | (2006.01) | |

(52) U.S. Cl.
CPC ..... *C08G 18/3814* (2013.01); *C08G 18/6279* (2013.01); *C08G 18/6651* (2013.01); *C09D 175/02* (2013.01); *C09D 175/04* (2013.01); *C10M 107/44* (2013.01); *E21B 17/042* (2013.01); *F16L 15/00* (2013.01); *F16L 15/001* (2013.01); *F16L 15/003* (2013.01); *F16L 15/004* (2013.01); *F16L 15/08* (2013.01); *F16L 58/10* (2013.01); *F16L 58/182* (2013.01); *C08G 2150/90* (2013.01); *C10M 2201/065* (2013.01); *C10M 2213/062* (2013.01); *C10M 2217/0453* (2013.01); *C10N 2230/06* (2013.01); *C10N 2250/08* (2013.01); *C10N 2250/121* (2013.01); *C10N 2280/00* (2013.01); *Y10T 428/139* (2015.01); *Y10T 428/1393* (2015.01)

(58) Field of Classification Search
CPC ................ F16L 58/182; Y10T 428/139; Y10T 428/1393; C09D 175/02; C09D 175/04; B05D 3/0254; B05D 1/02
USPC .......................... 427/421, 422, 372.2, 385.5
See application file for complete search history.

(56) References Cited

U.S. PATENT DOCUMENTS

| | | | |
|---|---|---|---|
| 6,846,779 | B1 | 1/2005 | Hinterwaldner et al. |
| 8,434,557 | B2* | 5/2013 | Chaddick .................. F17D 1/00 166/344 |
| 2004/0239105 | A1 | 12/2004 | Matsumoto et al. |
| 2005/0009711 | A1 | 1/2005 | Hinterwaldner et al. |
| 2007/0049684 | A1 | 3/2007 | Rische et al. |
| 2009/0220780 | A1 | 9/2009 | Bordet et al. |
| 2009/0236850 | A1 | 9/2009 | Goto et al. |
| 2010/0201119 | A1 | 8/2010 | Bordet et al. |
| 2012/0312527 | A1 | 12/2012 | Pinel et al. |
| 2013/0075083 | A1 | 3/2013 | Gard et al. |
| 2013/0193682 | A1 | 8/2013 | Gard et al. |

FOREIGN PATENT DOCUMENTS

| | | |
|---|---|---|
| JP | 7-301375 A | 11/1995 |
| JP | 2004-53013 A | 2/2004 |
| JP | 2008-69883 A | 3/2008 |
| JP | 2009-506142 A | 2/2009 |
| WO | 2010 057937 | 5/2010 |

OTHER PUBLICATIONS

International Search Report Issued Feb. 2, 2012 in PCT/EP11/06258 filed Dec. 12, 2011.
U.S. Appl. No. 14/316,351, filed Jun. 26, 2014, Bordet, et al.

* cited by examiner

PROCESS FOR COATING A THREADED TUBULAR COMPONENT, THREADED TUBULAR COMPONENT AND RESULTING CONNECTION

The present invention relates to a tubular component used for drilling and working hydrocarbon wells, and more precisely to the threaded end of such a component, said end being male or female in type and capable of being connected to a corresponding end of another component to form a connection.

The invention also relates to a process for producing a galling-resistant and corrosion-resistant film on such a tubular component.

A component which is "used for drilling and working hydrocarbon wells" means any element which is substantially tubular in form intended to be connected to another element of the same type or otherwise to finally constitute a string for drilling a hydrocarbon well, a riser or a work-over riser, or for a casing string or tubing string used in working wells. The invention is also applicable to components used in a drill string, such as drill pipes, heavy weight drill pipes, drill collars and the portions of pipe connections and heavy weight pipes known as tool joints.

Each tubular component comprises one end provided with a male threaded zone and/or one end provided with a female threaded zone each intended to be connected by makeup with the corresponding end of another component, the assembly defining a connection.

Threaded tubular components are connected under defined loads in order to satisfy the requirements for an interference fit and seal imposed by the service conditions, knowing that at the well, the threaded tubular components may be required to undergo several makeup-breakout cycles.

The conditions for use of such threaded tubular components give rise to different types of loads which make it necessary to use coatings on the sensitive portions of such components such as the threaded zones, abutments or sealing surfaces.

Makeup operations are generally carried out under a high axial load, for example the weight of a tube several metres in length to be connected via the threaded connection, possibly localized by a slight misalignment of the axis of the threaded elements to be connected, which induces risks of galling at the threaded zones and at the metal/metal sealing surfaces. For this reason, it is necessary to coat the threaded zones, the abutment surfaces and the metal/metal sealing surfaces with lubricants.

Furthermore, the threaded tubular components are stored (sometimes for several years), then made up in a hostile environment. This is the case, for example, in an offshore situation with sea spray and in an onshore situation when sand, dust or other pollutants are present. Thus, it is necessary to use coatings that counter corrosion, on the surfaces which have to cooperate by makeup (threaded zones) or by interfering contact (metal/metal sealing surfaces). It is also necessary to treat the surfaces against corrosion.

Environmentally, however, it appears that using makeup greases conforming to API (American Petroleum Institute) standard RP 5A3 does not constitute a long-term solution because such greases, which contain heavy metals, can be expelled from the tubular components and released into the environment or into the well, resulting in plugging which necessitates special cleaning operations. Furthermore, such greases have to be applied on site for each makeup operation.

In order to overcome the problems of requiring a long-term corrosion resistance and resistance to galling and to satisfy environmental prerogatives, the principal protagonists in the field of threaded connections have been actively developing solid, dry coatings (i.e. not pasty and not tacky like greases) which are both lubricants and protect against corrosion, and which can be applied definitively, at the factory, to the tubular components at the end of their manufacturing process and which are then ready for makeup.

In particular, coatings which are inert as regards the environment and which are resistant to wear and to atmospheric and climatic conditions are being developed.

Furthermore, the publication WO 2001/070918 discloses a method for depositing an anti-galling coating on a threaded connection having polyurethane resins as possible alternative binders. The anti-galling function is provided by means of organic or inorganic compounds which are capable of releasing gas at high temperatures such as those encountered in a well, thereby generating an increase in the compressible free volume in the contact in order to facilitate makeup/breakout without galling. The binder is principally a thermoplastic polyurethane, either mono- or bi-component, depending on the reactivity, or in aqueous dispersion.

Finally, publication WO 2005/045188 proposes, for a tubular threaded connection of the "expandable" type, a method for depositing a coating with a liquid or pasty matrix of the polysulphide type, but also of the elastomeric polyurethane, bi-component type, which can be cured in the combined absence of oxygen and moisture. The elongation performance is preferred over the mechanical performance (resistance to breaking under tension, hardness, abrasion resistance, adhesive force), in contrast to that sought by the invention.

The present invention is based on the discovery that using particular polyurethane and polyurea matrixes means that lubricating dry films can be obtained which are highly resistant to wear, are anti-galling, have high mechanical strength, with a low coefficient of friction and which are resistant to extreme hydrocarbon well working conditions. The solutions employed can also be adapted to various grades of metal for the connections for the tubular components cited above.

More precisely, the invention concerns a threaded tubular component for drilling or working hydrocarbon wells, said tubular component having at one of its ends a threaded zone produced on its outer or inner peripheral surface depending on whether the threaded end is male or female in type, in which at least a portion of the end is coated with at least one dry film with a Shore D hardness of more than 50 and comprising a matrix of polyurethane and polyurea, in which the urethane functionality is predominant with respect to the urea functionality in a proportion of at least 55% by weight.

Optional characteristics, which are complementary or substitutional, are defined below.

The polyurethane and polyurea matrix is of the mono-component type.

The polyurethane and polyurea matrix is obtained from a polyol type monomer with a high molecular weight, a chain extension agent and free aromatic isocyanates which can be cured by polyaddition using moisture.

The polyurethane and polyurea matrix comprises:
  a multifunctional isocyanate pre-polymer with a functionality of at least 2, prepared from a mixture of polyether, polybutadiene or hydroxylated polyester polyols with a molecular mass in the range 300 to 6000 g/mol and aromatic isocyanates of the diphenylmethane diisocyanate type, in excess;

a co-reagent of the mono- or bis-oxazolidone type in order to initiate the reaction and dilute the pre-polymer;

an aliphatic polyisocyanate curing agent of the hexamethylene diisocyanate type in order to maintain curing;

a catalyst for the pre-polymer of the dimorpholinodiethyl ether or dibutyl tin laurate type;

a plasticizer to control foaming during formation of the film, in particular of the triethylene phosphate type.

The polyurethane and polyurea matrix further comprises a moisture scavenger in order to stabilize the pre-polymer during storage by capturing residual water, said moisture scavenger being of the p-toluene sulphonyl isocyanate, trimethyl orthoformate or trimethyl orthoacetate type.

The polyurethane and polyurea matrix further comprises a $CO_2$ scavenger of the calcium oxide or magnesium oxide type in order to control foaming and the formation of bubbles during the reaction.

The polyurethane and polyurea matrix is of the bi-component type.

The polyurethane and polyurea matrix is obtained from a mixture of heat-fusible polyols and polyamines with a low molecular weight which can be cured by polycondensation using an aliphatic polyisocyanate.

The polyurethane and polyurea matrix comprises:
a polyol pre-polymer selected from polyester, polyether and polybutadiene polyols with a molecular mass in the range 300 to 6000 g/mol cured using an aliphatic polyisocyanate;

a heat-fusible polyamine with a functionality of 2 or more and with a molecular mass in the range 168 to 600 g/mol, in particular 4,4'-methylene-bis(2-chloroaniline); and an aliphatic polyisocyanate curing agent of the hexamethylene diisocyanate type, in excess.

The polyurethane and polyurea matrix further comprises at least one solid lubricant as a friction reducing agent, selected from the category of solid lubricants from class 1, 2, 3 or 4 in a proportion by weight in the range 5% to 30%.

The solid lubricant is selected from:
a solid lubricant from class 2 of the $Bi_2S_3$ type;
a solid lubricant from class 4 of the P 1 FE type; and a combination thereof.

The polyurethane and polyurea matrix further comprises a corrosion inhibitor.

The entire threaded zone is coated with polyurethane film.

The threaded tubular component comprises a metal/metal sealing surface, said sealing surface being coated with polyurethane film.

The invention also concerns a threaded tubular connection comprising a male threaded tubular component and a female threaded tubular component made up one into the other, in which at least one of said threaded tubular components is as defined above.

The invention also concerns a method for coating a threaded tubular component for drilling or working hydrocarbon wells, said tubular component having at one of its ends a threaded zone produced on its outer or inner peripheral surface depending on whether the threaded end is male or female in type, comprising the following steps:

producing a polyurethane and polyurea matrix as defined above, in the liquid state;

applying the polyurethane and polyurea matrix in the liquid state by spraying over a portion of the end of said threaded tubular component; and curing the matrix to form a polyurethane film with an essentially rigid structure.

Optional characteristics of the coating method, which are complementary or substitutional, are defined below.

The polyurethane and polyurea matrix is a mono-component matrix as defined above.

Curing of the polyurethane film is initiated by application of a relative humidity of at least 60% RH at a temperature of at least 20° C. optionally followed by drying.

Drying is carried out in an infrared or convection drying oven supplied with water vapour.

The polyurethane and polyurea matrix is a bi-component matrix as defined above.

The polyurethane film is cured by means of a bi-component spraying device with external mixing of hardener.

Curing of the polyurethane film is followed by a stoving or post-curing operation at a temperature of 90° C.

The features and advantages of the invention will be described in more detail in the description which follows, made with reference to the accompanying drawings in which.

Figure 1:
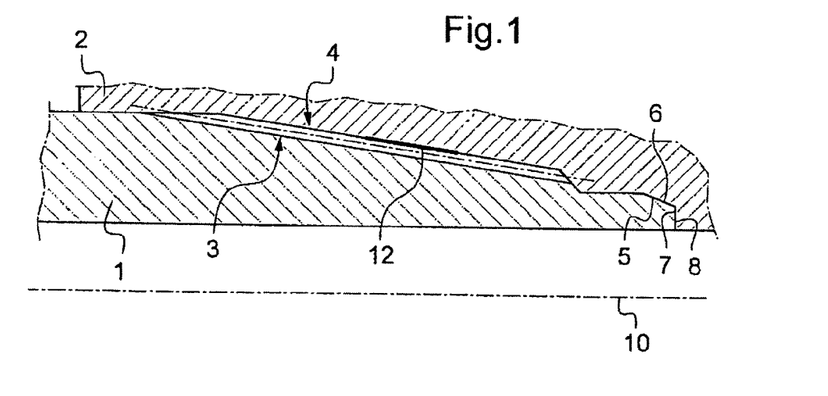
FIG. 1 is a diagrammatic view of a connection resulting from connecting two tubular components by makeup.
Figure 2:
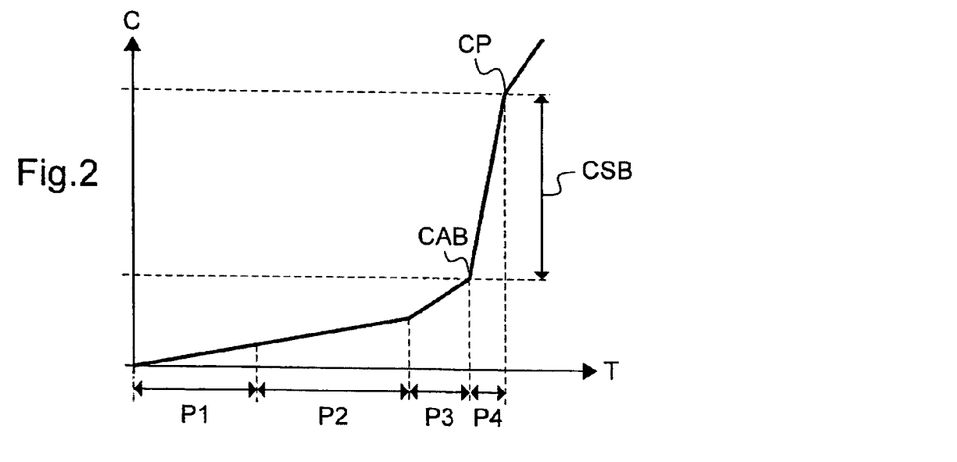
FIG. 2 is a diagrammatic view of a makeup curve for two threaded tubular components.

The threaded connection shown in FIG. 1 comprises a first tubular component with an axis of revolution 10 provided with a male end 1 and a second tubular component with an axis of revolution 10 provided with a female end 2. The two ends 1 and 2 each finish in a terminal surface which is orientated radially with respect to the axis 10 of the threaded connection and are respectively provided with threaded zones 3 and 4 which cooperate mutually for mutual connection of the two components by makeup. The threaded zones 3 and 4 may be of the trapezoidal, self-locking, etc thread type. Furthermore, metal/metal sealing surfaces 5, 6 intended to come into sealed interference contact against each other after connecting the two threaded components by makeup are provided respectively on the male and female ends close to the threaded zones 3, 4. Finally, the male end 1 ends in a terminal surface 7 which comes into abutment against a corresponding surface 8 provided on the female end 2 when the two ends are made up one into the other.

The Applicant has also foreseen other configurations wherein the abutment formed in the present case by the two contact surfaces 7 and 8 is replaced by self-locking interfering cooperation of the threaded zones 3, 4 (see U.S. Pat. No. 4,822,081, U.S. Pat. No. RE 30,467 and U.S. Pat. No. RE 34,467).

Figure 3:
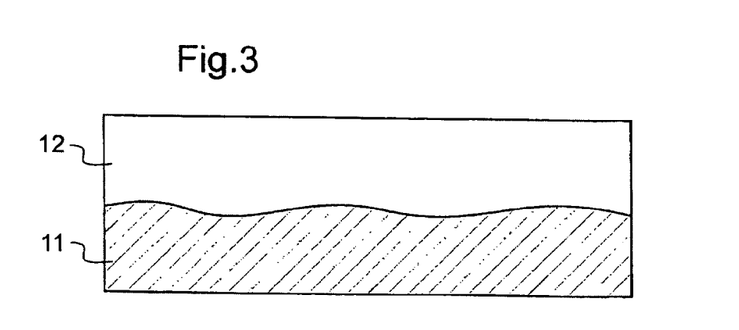
FIG. 3 is a diagrammatic view of a substrate coated with a lubricating dry film.

As can be seen in FIGS. 1 and 3, at least one of the threaded tubular connections is coated over a portion of its end 1, termed the substrate 11, with a film 12 of polyurethane with a Shore hardness of 50 or more, comprising a matrix of polyurethane and polyurea, in which the urethane functionality predominates over the urea functionality in a proportion of more than 55% by weight.

Since the urethane functionality predominates over the urea functionality, a certain rigidity and a certain hardness of the film is obtained, which guarantees good abrasion resistance. This predominance of the urethane functionality over the urea functionality is obtained by a judicious choice of certain parameters of the method, such as the choice of components and the molecular weights.

These rigid polyurethane coatings are distinguished by the nature of the oligomer and the curing agent used, but also in the nature of the reaction which occurs, the degree of curing and the method which is 100% solid state (no dissolving, nor dispersion of the polyurethane).

According to D K Chattopadhyay (Prog. Polym. Sci. 32 (2007), 352-418), two reactions are at the origin of obtaining rigid polyurethane coatings:

an exothermic reaction between a diisocyanate and a hydroxyl-functionalized monomer (polyether, polyester polyol, scheme 1) or amine-functionalized monomer (polyamine, scheme 2) for a bi-component:

an exothermic reaction in two steps starting from an isocyanate-functionalized polyester pre-polymer initiated by hydration (scheme 3) for a mono-component:

A first step consists of reacting the isocyanate functions with water under conditions of temperature and relative humidity (scheme 4)

In a second step, the polyamines may react with the free polyisocyanates (scheme 2).

Thus, the Applicant preferentially dealt with rigid polyurethanes for their mechanical properties of hardness, flexibility, rigidity under load, but above all in order to overcome environmental constraints related to emissions of volatile organic compounds (VOC).

Further, polyol polymers of low molecular mass were used to obtain low viscosity binders in order to reduce the use of organic VOC-releasing solvents, but this contributed to an increase in reactivity and made manipulation of the products restrictive. An alternative corresponded to the use of a co-reagent based on oxazolidine in particular in mono-component polymers where curing is initiated by moisture. Oxazolidines facilitate both the reduction in viscosity of the high molecular mass polyol or polyamine polymers, but their blocked aminated alcohol chemical nature means that they can initiate and accelerate curing by hydrolysis of the hydroxyl and amine reactive functions exposed to favourable moisture conditions.

Thus, from existing rigid polyurethane coatings, the Applicant paid particular attention to rigid polyurethane and polyurea coatings because of their high degree of curing which induces a dense intermolecular network producing properties of hardness, corrosion resistance and chemical resistance which are superior to other grades.

One of the major differences between a rigid and a soft (or elastomeric) polyurethane is given by the ratio between the isocyanate-functionalized pre-polymer and the polyol and/or polyamine polymer. The closer the ratio is to 1, the more rigid is the polyurethane/polyurea coating obtained. One of the means for measuring rigidity and thus the degree of curing is the hardness of the film on different scales (Shore D and Shore A or pencil hardness) using a durometer. The highest Shore hardness (>50 Shore D) is measured for a ratio of 1, while a low Shore hardness (30 Shore A), corresponding to a soft or elastomeric coating, is measured for ratios of less than 0.4.

The Applicant was particularly interested in hybrid polyurethane/polyurea coatings which have other advantages linked to the combination of urethane and urea functions in the same coating. In contrast to the polyurethane fraction in the cured film, the polyurea fraction provides superior cohesive energy, thermal stability and adhesion because of greater polarity. The polarity is accentuated by increasing the hydrophilic portion bonded to the urea function.

The polyurea fraction provides the coating with flexibility and relative insensitivity to moisture during the method, in contrast to the polyurethane system alone.

Since the reaction kinetics between the amine function and an isocyanate are preferential compared with those between the hydroxyl function and an isocyanate, foaming of the polyurea systems or of systems incorporating the polyureas is almost impossible. In all other cases, in particular if a catalyst for the reaction is present, foaming may result in a reduction in the density of the network, porosity and inferior performance.

The matrix cited above may be either mono-component in type or bi-component in type.

The mono-component polyurethane matrix is obtained from a high molecular weight polyol type monomer, a chain extension agent and free aromatic isocyanates which can be cured by polyaddition by means of moisture.

As an example, the mono-component matrix may comprise:
- a multifunctional isocyanate pre-polymer with a functionality of at least 2, prepared from a mixture of polyether, polybutadiene or hydroxylated polyester polyols with a molecular mass in the range 300 to 6000 g/mol and aromatic isocyanates of the diphenylmethane diisocyanate type, in excess;
- a co-reagent of the mono- or bis-oxazolidone type in order to initiate the reaction and dilute the pre-polymer;
- an aliphatic polyisocyanate curing agent of the hexamethylene diisocyanate type in order to maintain curing;
- a catalyst for the pre-polymer of the dimorpholinodiethyl ether or dibutyl tin laurate type; and
- a plasticizer to control foaming during formation of the film, in particular of the triethylene phosphate type.

This mono-component matrix may further comprise a moisture scavenger in order to stabilize the pre-polymer during storage by capturing residual water, in particular of the p-toluene sulphonyl isocyanate, trimethyl orthoformate or trimethyl orthoacetate type.

If necessary, it may also comprise a $CO_2$ scavenger of the calcium oxide or magnesium oxide type in order to control foaming and the formation of bubbles during the reaction.

The bi-component polyurethane matrix is obtained from a mixture of heat-fusible polyols and polyamines with low molecular weights which can be cured by polycondensation using an aliphatic polyisocyanate.

As an example, the bi-component matrix may comprise:
- a polyol pre-polymer selected from polyether, polybutadiene and hydroxylated polyester polyols with a molecular mass in the range 300 to 6000 g/mol;
- a heat-fusible polyamine with a functionality of 2 or more and with a molecular mass in the range 168 to 600 g/mol, in particular 4,4'-methylene-bis(2-chloroaniline); and
- an aliphatic polyisocyanate curing agent of the hexamethylene diisocyanate type, in excess.

The matrix of the invention may also comprise particles of solid lubricant from at least one of classes 1, 2, 3 and 4 in a proportion by weight in the range 5% to 30%. Preferably, said solid lubricant is selected from a solid lubricant from class 2 of the $Bi_2S_3$ type, a solid lubricant from class 4 of the PTFE type, and a combination thereof.

The term "solid lubricant" as used here means a solid and stable body which, on being interposed between two frictional surfaces, can reduce the coefficient of friction and reduce wear and damage to the surfaces. These bodies can be classified into different categories defined by their functional mechanism and their structure, namely:

- class 1: solid bodies owing their lubricating properties to their crystalline structure, for example graphite, zinc oxide (ZnO) or boron nitride (BN);
- class 2: solid bodies owing their lubricating properties to their crystalline structure and also to a reactive chemical element in their composition, for example molybdenum disulphide $MoS_2$, graphite fluoride, tin sulphides, bismuth sulphides, tungsten disulphide, or calcium fluoride;
- class 3: solid bodies owing their lubricating properties to their chemical reactivity, for example certain chemical compounds of the thiosulphate type, or Desilube 88® sold by Desilube Technologies Inc;
- class 4: solid bodies owing their lubricating properties to a plastic or viscoplastic behaviour under frictional stress, for example polytetrafluoroethylene (PTFE) or polyamides.

The matrix may also incorporate other additives such as a corrosion inhibitor, for example.

The coating method of the invention essentially consists of spraying the polyurethane film in the liquid state onto the threaded tubular component then polymerizing it, which means that a coating can be obtained with superior frictional, abrasion resistance and adhesion properties.

It is a rigid polyurethane film with a Shore D hardness of more than 50 obtained by means of a matrix of polyurethane and polyurea not including and not requiring any addition of a solvent or diluent.

The coating method may be carried out rapidly on either the male or female portion of a tubular component.

The invention can advantageously be used to replace an acrylic-epoxy coating cured by ultraviolet light on the male portion of the connection, thereby providing superior or equivalent glide performance and anti-corrosion protection with a rigid mono-component polyurethane.

Further, the invention means that coefficients of friction of less than 0.06 can be obtained irrespective of the pressure and the zone of the threading with a rigid bi-component polyurethane and thus relatively low shouldering torque values can be obtained.

The superior hardness of the rigid polyurethane coatings points to a model of friction by sliding in the contact to increase the longevity of the coating, in contrast to other coatings which are friable even under low loads.

The Applicant has preferentially selected to carry out deposition by spraying, i.e. a 100% solid state method, of a matrix of polyurethane and polyurea with a rigid structure associated with a high hardness:
- a mono-component polyurethane matrix obtained by polyaddition by means of initiation by moisture;
- a bi-component polyurethane matrix obtained by polycondensation.

The mono-component film curing reaction is initiated above a relative humidity of 60% RH at 20° C. It may be followed by drying. The curing rate is increased with an increase in the moisture level and the temperature.

In the case of a mono-component film, the initial curing to obtain a dry varnish can be carried out in two steps:
The first comprises the following operations:
- applying a minimum relative humidity of 70% RH for 10 minutes at 30° C.; or
- applying a relative humidity of 70% RH for 10 minutes at 90° C.

The second comprises the following operations:
- drying in an oven at 80° C. for 2 hours; or
- drying in an oven at 130° C. for 15 minutes.

It is dry to the touch 25 minutes after curing. In all cases after cooling, curing is carried out under relative humidity and at ambient temperature in air so that it is complete after a minimum of 24 hours.

Further, there are few or no risks of instantaneous corrosion or flash rusting during the drying step as the hydrophilic nature of the isocyanate portion which is slightly in excess is sufficient to prevent water from being trapped in the form of vapour or condensed as an interphase between the coating formed and the substrate. All of the residual water reacts with the isocyanate functions by hydrolysis to favour polymerization until the end of curing.

Drying can be carried out in an infrared or convection drying oven. The oven may be supplied with water vapour by means of a controlled humidity generator, if necessary.

Curing of bi-component films is much more rapid. Since the setting time may be less than 2 minutes at ambient temperature, curing is carried out using a bi-component spraying system, for example such as that proposed by Walther or Devilbiss with a gun with external hardener mixing. It is used by reacting the polyol and/or polyamine compound A and the compound or hardener B in the liquid state in a ratio in the range 1.07 to 1.12.

Stoving or post-curing at a temperature of 90° C. directly after application can increase the curing rate and avoid reactivity with the moisture in the ambient air.

The Applicant carried out a certain number of evaluation tests.

The water resistance properties were evaluated by means of accelerated tests for exposure to moist conditions and the tribo-rheological properties of the formulated material or lubricating coating were determined by means of a Scratch test for the frictional value and the adhesion.

The galling resistance was evaluated by means of a Falex tribological test in a configuration conforming to that of the connection.

The corrosion tests consist of a salt spray test carried out in a climatic chamber under the following conditions: 35° C. with a 50 g/L saline solution with a density in the range 1.029 to 1.036 at 25° C., with a pH in the range 6.5 to 7.2 at 25° C. and recovered at a mean rate of 1.5 mL/h.

Specimens that were intact without rusting correspond to the ReO class of ISO standard 9227 after exposure. The method provides a means of verifying that the comparative quality of a metallic material with or without a corrosion protective coating (metallic or organic coating on metallic material) is maintained.

The water resistance tests consist of subjecting the specimens to an accelerated corrosion test in accordance with DIN standard 50017 carried out in a climatic chamber. This test, comprising one cycle per day, consists of depositing water vapour by condensation under the following conditions: 35° C., 90% relative humidity for 8 hours, then allowing the specimen to dry. After 7 cycles, a check is made to see whether the substrate protected by the dry coating has corroded.

Excellent resistance must correspond to the classifications in ISO standard 4628: no corrosion, no blistering, no cracking, nor flaking of a chromium or carbon steel plate either as-machined or treated by phosphatation with zinc (8 to 20 g/m$^2$ deposit of phosphate) or manganese (4 to 16 g/m$^2$ of phosphate). The reference substrate may also be treated with an electrolytic deposit of a ternary Cu—Sn—Zn alloy with an intermediate layer of Ni.

The water immersion test is much more severe than the water resistance test of DIN standard 50017. It consists of testing the water resistance of the coatings. It is derived from ASTM standard D870-09 relating to industrial and automobile paints.

Immersion in water may cause coatings to degrade. Knowledge regarding the manner in which a coating resists immersion in water is useful for predicting its service life. Rupture or failure in a water immersion test may be caused by a number of factors, in particular a deficiency in the coating itself, contamination of the substrate, or insufficient surface preparation. Thus, the test is useful for evaluating the coatings alone or complete coating systems.

Figure 5:
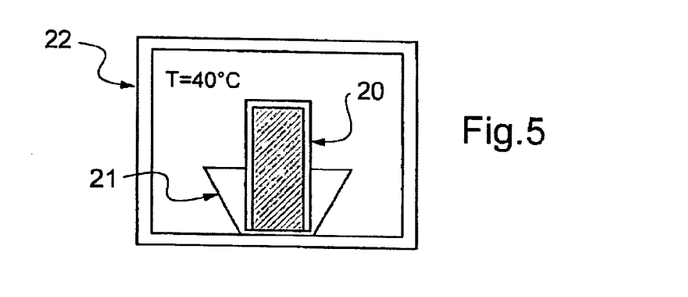
FIG. 5 is a diagrammatic view of another test set-up.

The test consists of half-immersing a specimen 20 in demineralized water 21 for a period of 168 hours at 40° C. in an oven 22, as shown in FIG. 5. Adhesion, blistering, rust, or blowholes are observed visually to indicate the sensitivity of the coating to water. The test may be followed by determining the moist adhesion using a Scratch test.

Figure 4:
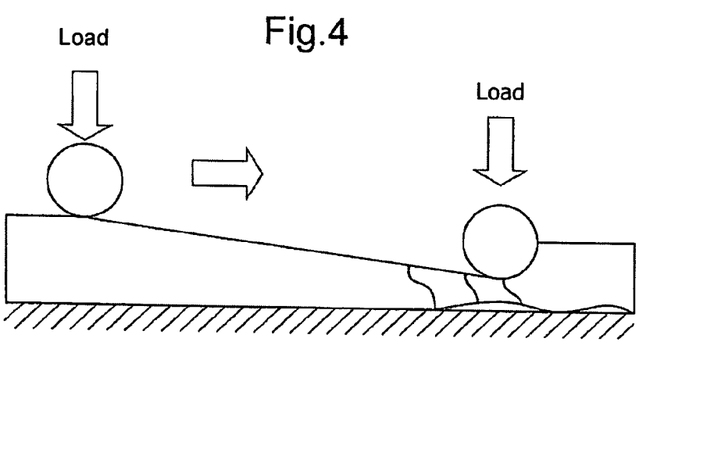
FIG. 4 is a diagrammatic view of a test set-up.

The test known as the "Scratch test", shown diagrammatically in FIG. 4, allows the adhesive force or adhesion of a film on a surface or surface preparation to be determined. The method, consisting of shearing and deforming a film with a spherical bead subjected to an increasing load, also allows two major tribological parameters to be determined, namely the coefficient of friction and the critical load corresponding to the appearance of a loss of film cohesion. The test is particularly suitable for coatings with a sliding friction model, such as polyurethanes.

The specimens are coated by pneumatic spraying. The curing conditions for the film are specific and principally depend on the physico-chemical characteristics of the binder.

The experimental conditions employ a spherical indenter formed from Inconel 718 with a diameter of 5 mm and a metal specimen formed from XC48 carbon steel or Z20C13 chrome steel, as-machined or with a zinc phosphatation or electrolytic Cu—Sn—Zn deposit type surface preparation.

The parameters are: a load increasing from 10 N to 310 N at a load increase rate of 15 N/s or a load increasing from 250 N to 750 N at a load increase rate of 25 N/s for the more abrasion-resistant coatings. The bead displacement rate is 2 mm/s for a period of 20 s (the track length is 40 mm).

The measured coefficient of friction is considered to be low when it is in the range $\mu=0.05$ for a load of 10 N and $\mu=0.09$ for a load of 310 N. A $\mu$ of 0.07 was measured for a load of 310 N on a carbon steel surface. It should be noted that it is necessary to clearly set out the load and operating conditions for the test for each type of coating.

The cross hatch test consists of determining the resistance of a mono- or multi-layer coating to being separated from a substrate when the coating is cross-hatched by making incisions up to said substrate in accordance with a classification into six categories. Excellent adhesion of the coating to the substrate must correspond to class 0 of ISO standard 2409 (2007): perfectly smooth edges to the incisions, none of the cross hatch squares detached. In order to take the environment into account, the cross hatch test is carried out after being placed in a moist medium (35° C. and 90% RH). No change in appearance, no blistering, no corrosion, no cracking, no flaking corresponding to the classifications in ISO standard 4628, and no loss of adhesion are characteristics of good moisture resistance.

Figure 6:
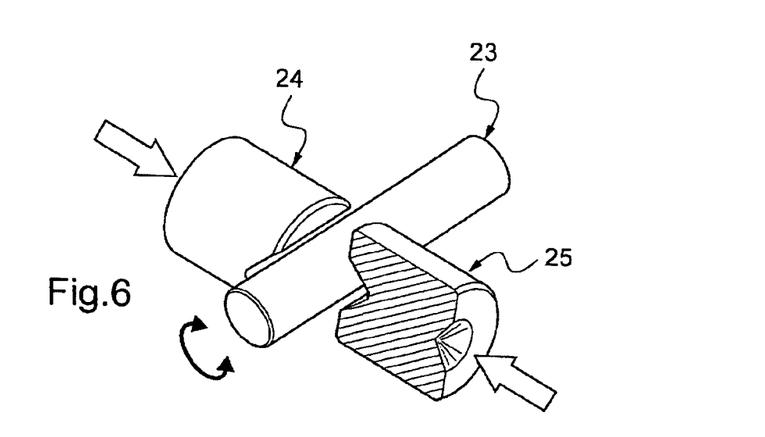
FIG. 6 is a diagrammatic view of another test set-up.

The high pressure wear resistance (also termed the Falex test) uses a rotating pin 23 compressed between two V-shaped blocks 24 and 25 as described in FIG. 6. The Falex test is used in particular at high speeds to evaluate anti-wear and extreme pressure properties of lubricant fluids in accordance with ASTM standard D 2670 and ASTM D 3233, but it is also used at low speeds to evaluate solid lubricants in accordance with ASTM method D 2625. The Falex test is adapted to accommodate threaded connections used in working hydrocarbon wells in that it uses:
- a semi-closed contact geometry (to ensure that a third lubricating body is trapped);
- a cylindrical geometry for the pins adapted to application of a polyurethane type coating;
- a pressure-velocity range (PV diagram) which matches up with that of the connection;
- the possibility of carrying out single direction or alternating tests in order to simulate make and break type operations.

The test conditions are as follows:
load=785 N;
rotational speed of pin=60 rpm;
mean metal/metal contact pressure=560 MPa;
pin sliding speed=20 mm/s.

The aim of this test is to simulate, determine and compare the endurance (galling resistance) of the various coatings without the need to carry out the determination on connections.

The galling criterion is defined using ASTM standard D 2625-94 relating to the measurement of the loading capacity of the solid lubricant film and corresponds to a sharp increase of the torque compared with the initial state of the order of 1130 N·mm or of the coefficient of friction of the order of 0.15 for a load of 785 N.

The rigid mono or bi-component polyurethane film of the invention offers the following principal advantages:
- coating hardness greater than or equal to epoxy resins, which provides a reinforced model of friction by sliding over surfaces with no stick-slip phenomenon, which means that an anti-galling surface treatment such as electrolytic Cu—Sn—Zn deposits can be dispensed with. The properties of the coating are thus maintained over time, ensuring that M&B (make and breaks) are reproducible;
- superior impact resistance, particularly over acrylic-epoxy resins, reinforcing the mechanical performance under shear/compressive loads;
- superior adhesion and flexibility of the film on the substrate compared with epoxy resins, reinforcing the applicability to complex geometries such as a threading;
- reinforced electrolyte barrier effect (in particular no residual water on drying), ensuring better anti-corrosion protection, even with no corrosion inhibitors;
- low ecological impact and great safety for the user because of the absence of volatile organic compounds (VOC);
- conservation of mechanical properties in the range −40° C. to +125° C. as the glass transition temperatures are excluded from this range.

Current thinking in this regard falls into a number of technological camps, each with gaps:

Acrylic-epoxy resins cured using UV, particularly used as a protective coating and described in publications WO 2006/104251 and WO 2009/072486, have the disadvantage of not being able to be applied to a female connection or box because of the geometry of the threading.

Polyurethane resins currently applied in the art to threaded connections are reactive elastomeric thermoplastic grades, which can advantageously provide the connection with a seal but wherein the mechanical properties are inferior to rigid polyurethanes.

Techniques based on thermoset epoxy resins necessitate the application of a protective lower layer protecting against corrosion, possibly a keying primer and an upper lubricating layer, necessarily increasing the manufacturing time.

In response to this technology, obtaining an ultra-resistant heat cured coating of the rigid polyurethane type means that the frictional properties and keying properties on various surfaces or surface preparations and the protection necessary for a suitable response to the problems of a connection can be combined into a single layer irrespective of the zone of the threading which is loaded.

The Applicant focused on obtaining rigid polyurethane coatings as follows:
- a polyurethane mono-component marketed by the supplier HK Wentworth under the trade name Electrolube NVOC, for its 7H pencil hardness which is greater than fluorourethane, for its flexibility and for excellent adhesion to metallic substrates;
- a bi-component polyurethane/polyurea marketed by the supplier Merylithe under the trade name Isolythe 115, for its rapid method of production, for its high hardness of 750 Hv compared with carbon steels, for its flexibility and for its high mechanical strength.

Firstly, the Applicant determined the experimental conditions for preparing a mono-component polyurethane coating.

The NVOC mono-component polyurethane can be diluted in a non-hydroxylated organic solvent with no VOCs (volatile organic compounds) of the propylene carbonate type in order to adjust its viscosity. The viscosity must be in the range 70 to 200 cPs at 20° C. to ensure good coverage by pneumatic spraying.

Adding a polydimethylsiloxane silicone surfactant may be foreseen in order to improve wetting of the support.

The reaction of the polyols on the isocyanate functions liberates a large quantity of $CO_2$ which may be included in bubbles or blisters. An alkaline magnesium or calcium oxide type compound may be added as a $CO_2$ scavenger.

Application onto the substrate at ambient temperature in the range 10° C. to 30° C. was carried out by spraying using a pneumatic gun with a 1.7 mm nozzle and a pressure of 4 to 6 bars.

The coated substrate was then introduced into an oven at 90° C. and cured for 10 minutes with a relative humidity of at least 80% obtained by means of water vapour generated using an Erlenmeyer flask containing water heated to boiling point disposed outside the oven and connected into the oven to a chamber device accommodating the size of the specimen via a flexible tube with heat insulation. Curing initiation was followed by a step for drying at ambient temperature for 72 hours.

An alternative consists of placing a container of hot water with a volume of more than 1 L inside the oven.

Other methods may be foreseen and consist of heating the substrate by induction. The water vapour is generated using an Erlenmeyer flask containing water heated to boiling point and diffused into the vicinity of the specimen. The relative humidity is more difficult to control but remains at a level measured at between 65% and 90%.

The thickness of the moist film must be approximately 20% greater than that desired for the dry film because of the loss of $CO_2$ during the reaction by evaporation. The thickness of the dry film is in the range 30 to 50 μm.

Secondly, the Applicant determined the experimental conditions for preparing a bi-component polyurethane coating.

The polyurethane/polyurea bi-components studied comprised a component A prepared from a mixture of polyester polyol and 4,4'-methylene-bis(2-chloroaniline). The component A had the feature of being liquid from 70° C. because of the presence of the polyamine with a melting point in the range 85° C. to 90° C.

In order to be able to apply it in the laboratory, the Applicant heated and homogenized component A at 90° C. In order to avoid premature re-crystallization, component A was diluted to 30% by weight with a compatible organic VOC-free solvent of the dibasic ester type such as a methyl ester, preferably an isobutyl ester.

Under these conditions, the diluted component A had a viscosity of less than 200 MPa·s at 20° C. and less than 100 MPa·s at 90° C., and may be stored for at least two months at ambient temperature without risk of crystallization.

The liquid component B with a viscosity in the range 1 to 2 Pa·s was mixed into the component A at ambient temperature and preferably into the component A at 90° C. in order to facilitate the homogeneity.

The quantities by weight employed for the mixture were 52% of diluted component A and 48% of component B.

After homogenizing for 30 to 40 seconds with slow mechanical stirring in order to avoid incorporating air bubbles, the mixture was applied to the support at ambient temperature using a film applicator.

The support was then introduced into a post-curing oven for 15 minutes at 90° C. The thickness of the dry film obtained was in the range 20 to 40 μm.

The results obtained will now be described.

Firstly, the Applicant evaluated the adhesion performances of the non-loaded mono and bi-component polyurethane coatings in order to compare them, inter alia, with those obtained for coatings of the epoxy, acrylic-epoxy and fluorourethane type.

The epoxy coating consisted of an aqueous dispersion of oligomer of the bisphenol A resin type hardened using a diamine-functionalized type hardener. This type of epoxy coating is mentioned in particular in the publication WO 2008/090411.

The acrylic-epoxy coating consisted of a resin mixture of (1-methyl-1,2-ethanediyl)bis[oxy(methyl-2,1-ethanediyl)] diacrylate and trimethylolpropane triacrylate cured using ultraviolet radiation. This type of coating, with a 3H pencil hardness, is mentioned in particular in publications WO 2006/104251 and WO 2009/072486.

The fluorourethane coating consisted of an aqueous dispersion of fluoroethylenevinylether polymer hardened using an aliphatic polyisocyanate hardener.

The adhesion to various metallic substrates was determined using the Scratch test for loads increasing from 10 N to 750 N corresponding to steel/steel contact pressures in the range 1.0 to 4.5 GPa. The values for the Young's modulus taken from the literature for rigid polyurethane type thermoset polymers were in the range 4 to 5 GPa. Using these values, it was possible to estimate that the mean pressure was in the range 150 to 450 MPa for loads in the range 10 to 310 N. These pressures correspond to the theoretical pressures determined for the threadings during shouldering.

Table 1 summarizes the roughnesses determined using a rugosimeter in accordance with ISO standard 1997 for the specimens used.

TABLE 1 roughness of test specimens as a function of surface preparation

| Surface preparation | XC48 AsM | 13Cr | PhZn | PhMn | TA |
|---|---|---|---|---|---|
| Ra (μm) | 0.9 ± 0.05 | 0.09 | 0.8 ± 0.05 | 1.6 ± 0.1 | 1 ± 0.2 |
| Rz (μm) | 4.8 ± 0.2 | 0.9 ± 0.1 | 5.1 ± 0.3 | 11.1 ± 1.0 | 8 ± 1.4 |

The critical loads for the Scratch test as well as the adhesions using the cross hatch test in accordance with ISO standard 2409 (class 0 for excellent adhesion, class 5 for mediocre adhesion) are reported in Tables 2, 3, 4 and 5 respectively for an as-machined carbon steel substrate (XC48 AsM), carbon steel with zinc or manganese phosphatation (PhZn), rolled stainless steel containing 13% chromium (13Cr) and carbon steel coated with an electrolytic Cu—Sn—Zn deposit (TA).

TABLE 2 comparison of adhesiveness on XC48 AsM

| Test/chemical nature | Ref A | Ref B | Ref C | Ref D | Ref E |
|---|---|---|---|---|---|
| FEVE resin | X | — | — | — | — |
| Epoxy resin | — | X | — | — | — |
| Acrylic-epoxy resin | — | — | X | — | — |
| PU 1K resin, 100% solid state | — | — | — | X | — |
| PU 2K resin, 100% solid state | — | — | — | — | X |
| Scratch test - critical load or Lc (N): | 288 | >310 | <10 | 606 | 600 |
| Cross hatch test (ISO 2409)- adhesion class: | 0/5 | 0/5 | 0/5 | 0/5 | 0/5 |

TABLE 3 comparison of adhesiveness on PhZn

| Test/chemical nature | Ref A | Ref B | Ref C | Ref D |
|---|---|---|---|---|
| FEVE resin | X | — | — | — |
| Epoxy resin | — | X | — | — |
| Acrylic-epoxy resin | — | — | X | — |
| PU 1K resin, 100% solid state | — | — | — | X |
| PU 2K resin, 100% solid state | — | — | — | — |
| Scratch test - critical load or Lc (N): | 375 | >310 | <10 | 644 |
| Cross hatch test (ISO 2409)- adhesion class: | 0/5 | 0/5 | 0/5 | 0/5 |

TABLE 4 comparison of adhesiveness on 13Cr

| Test/chemical nature | Ref A | Ref B | Ref C | Ref D |
|---|---|---|---|---|
| FEVE resin | X | — | — | — |
| Epoxy resin | — | X | — | — |
| Acrylic-epoxy resin | — | — | X | — |
| PU 1K resin, 100% solid state | — | — | — | X |
| Scratch test - critical load or Lc (N): | 415 | >310 | <10 | 638 |
| Cross hatch test (ISO 2409)- adhesion class: | 0/5 | 0/5 | 0/5 | 0/5 |

TABLE 5

| comparison of adhesiveness on TA | | | |
|---|---|---|---|
| Test/chemical nature | Ref A | Ref B | Ref C |
| FEVE resin | X | — | — |
| Epoxy resin | — | X | — |
| PU 1K resin, 100% solid state | — | — | X |
| Scratch test - critical load or Lc (N): | 415 | >310 | 475 |
| Cross hatch test (ISO 2409)- adhesion class: | 0/5 | 0/5 | 0/5 |

The rigid mono and bi-component polyurethane coatings had relatively high adhesions irrespective of the chemical nature of the surface preparation. The test allowed the capacity of the coating to remain in place in the contact under shear/compressive stress to be expressed. A high adhesive force and cohesion allows sufficient separation of the surfaces to increase the longevity and resistance to galling. The resistance of the polyurethane coating is comparable to that of an epoxy resin and substantially higher than that of a UV curable acrylic-epoxy resin.

The rigid polyurethane resins, and in particular the mono-component resin with curing initiated by moisture, were selected for their flexibility and impermeability over other chemical natures. Table 6 shows the results of adhesion after 168 hours of immersion in demineralized water at 40° C.

Table 6a: comparison of adhesion after immersion in demineralized water of a rigid mono-component polyurethane coating on XC48 AsM

| Test/chemical nature | Ref A | Ref B | Ref C |
|---|---|---|---|
| FEVE resin | X | — | — |
| Acrylic-epoxy resin | — | X | — |
| PU 1K resin, 100% solid state | — | — | X |
| Scratch test - critical load or Lc (N): | 124 | 122 | 469 |

Table 6b: comparison of adhesion after immersion in demineralized water of a 100% solid state rigid mono-component polyurethane coating on different substrates

| Test/chemical nature | PhZn | | 13Cr | | TA | | |
|---|---|---|---|---|---|---|---|
| FEVE resin | X | — | — | X | — | — | — |
| Acrylic-epoxy resin | — | X | — | — | X | — | — |
| PU 1K resin, 100% solid state | — | — | X | — | — | X | X |
| Scratch test - critical load or Lc (N): | 444 | 127 | 537 | 513 | 30 | 568 | 606 |

The rigid mono-component polyurethane had remarkable impermeability, and excellent moist adhesion. Regarding critical loads, it is important to note that adhesion was not influenced by the immersion test and could be reinforced under the test conditions, thereby confirming the importance of this technology since curing could be continued over time if the relative humidity is above the reaction activation threshold. The moisture is consumed up to saturation, thereby limiting problems with blistering or poor binding of the interfacial layer.

In order to illustrate the impermeability of the coating, the Applicant carried out contact angle measurements on a 3 μL droplet of distilled water placed on the surface of the dry coating, using a Kruss DSA 100 goniometer (needle diameter=0.52 mm) as shown in Table 7.

TABLE 7

| Test/chemical nature | Ref A | Ref B |
|---|---|---|
| FEVE resin | X | — |
| PU 1K resin, 100% solid state | — | X |
| Kruss DSA 100 goniometer - contact angle θ: | 84.9 ± 10.9 | 117.4 ± 9.3 |

Secondly, the Applicant evaluated the tribological performances of non-loaded rigid mono and bi-component polyurethane coatings in order to compare them, inter alia, with those obtained for the epoxy type, acrylic-epoxy and fluorourethane type coatings.

TABLE 8

| Test/chemical nature | XC48 AsM | | | | PhZn | | | TA | |
|---|---|---|---|---|---|---|---|---|---|
| FEVE resin | — | — | — | — | — | — | — | X | — |
| Acrylic-epoxy resin | — | X (13Cr) | — | — | — | X | — | — | — |
| PU 1K resin, 100% solid state | — | — | X | — | — | — | X | — | X | — |
| PU 2 K resin, 100% solid state | — | — | — | X | — | — | — | — | X |
| Scratch test, average COF (10-310N): | — | 0.242 | 0.079 | 0.061 | — | 0.324 | 0.080 | 0.090 | 0.078 | 0.053 |
| Scratch test, average COF (250-750N): | — | 0.298 | 0.083 | 0.128 | — | 0.236 | 0.084 | 0.210 | 0.109 | 0.111 |

Figure 7:
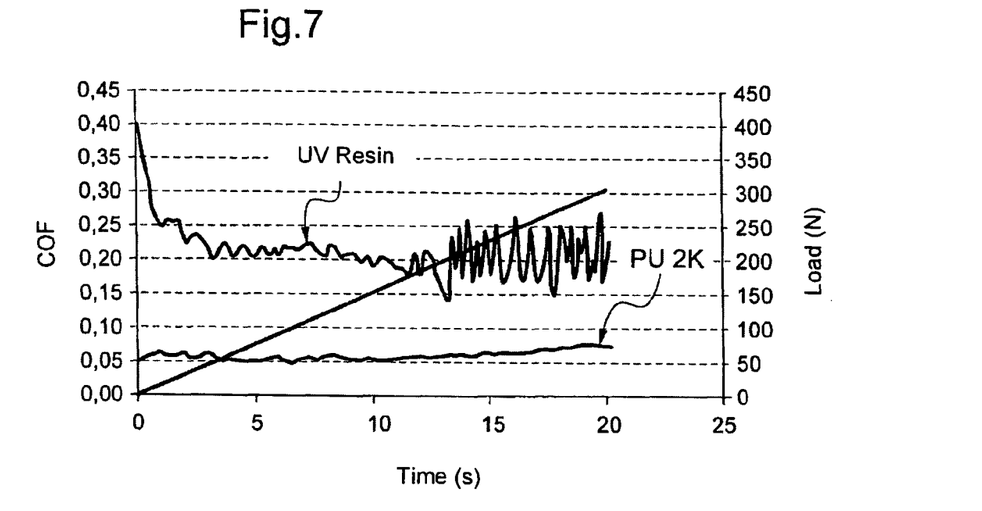
FIGS. 7 and 8 show test curves.
Figure 8:
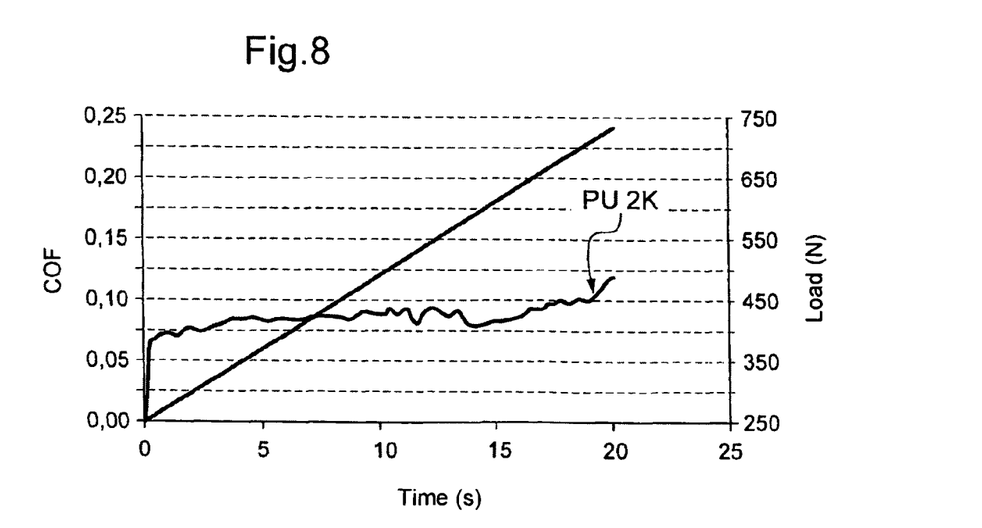

Irrespective of the deposition method, the coefficient of friction for a rigid polyurethane coating was less than $\mu=0.080$ for loads of 310 N or less, corresponding to metal/metal contact pressures reaching 3.5 GPa irrespective of the substrate, which ensured good lubrication even without a friction reducing additive. The coefficient of friction was in the range $\mu=0.080$ to $\mu=0.13$ for loads in the range 250 to 750 N, corresponding to metal/metal contact pressures reaching 4.5 GPa. The frictional curves on coated carbon steel illustrating these results in FIGS. 7 and 8 show a low, stable coefficient of friction for the 100% solid state PU 2K resin (2 components) compared with the UV curable acrylic-epoxy resin which, from a load of 200 N, exhibited severe delamination marked by erratic, high friction. The friction in FIG. 8 was increasing as a function of the load applied but remained less than μ=0.12.

The low frictional value was induced by the high hardness and the relatively high adhesive force of the selected rigid polyurethanes, thereby demonstrating a superior sliding friction model.

Stable coefficients of friction of less than μ=0.06 for pressures in the range 150 to 400 MPa corresponding to mean pressures in the threadings during shouldering during conventional makeup mean that when making up 7" 29# L80 VAM TOP HT connections, which are highly sensitive to galling (the makeup torque is 29900 N·m), relatively low values for the shouldering torque can be foreseen, as opposed to shouldering torques of between 68% and 74% for a fluorourethane resin with high frictional values especially on a carbon steel specimen with a Cu—Sn—Zn electrolytic deposit (FR 906320).

Thirdly, the Applicant determined the intrinsic anti-corrosion properties of the coatings of the invention.

The results obtained on different surface preparations with respectively a rigid mono-component polyurethane and a rigid bi-component polyurethane coating are shown in Tables 9 and 10.

TABLE 9 corrosion resistance for rigid mono-component polyurethane, NVOC

| Surface preparation | Exposure time | | | | | | |
|---|---|---|---|---|---|---|---|
| | 24 h | 48 h | 250 h | 500 h | 750 h | 1000 h | 1500 h |
| XC48 AsM | Re0 | Re0 | Re1 | Re1 | Re1 | Re2 | Re3 |
| 13Cr | Re0 | Re0 | Re0/1 | Re0/1 | Re0/1 | Re0/1 | Re0/1 |
| PhZn | Re0 | Re0/1 | Re1 | Re1/2 | Re1/2 | Re2 | Re2 |
| TA | Re0 | Re0 | Re0 | Re0/1 | Re1 | Re1/2 | Re2 |

TABLE 10 corrosion resistance for rigid bi-component polyurethane, Isolythe 115

| Surface preparation | Exposure time | | | | | | |
|---|---|---|---|---|---|---|---|
| | 24 h | 48 h | 250 h | 500 h | 750 h | 1000 h | 1500 h |
| XC48 AsM | Re0 | Re0/1 | Re1 | Re1/2 + 3S3 blistering | Re2 + 4S3 blistering | — | — |
| TA | Re0 | Re2 | Re4 | — | — | — | — |

By way of comparison, Table 11 compares the anti-corrosion performances of rigid polyurethane coatings with other resins containing no corrosion inhibitor on the same surface preparation.

TABLE 11 comparison of corrosion resistance on carbon steel and zinc phosphatation

| Chemical nature | Surface preparation | Exposure time | | | | | | |
|---|---|---|---|---|---|---|---|---|
| | | 24 h | 48 h | 250 h | 500 h | 750 h | 1000 h | 1500 h |
| Resin, 100% solid state, 1K | PhZn | Re0 | Re0/1 | Re1 | Re1/2 | Re1/2 | Re2 | Re2 |
| FEVE resin | | Re0 | Re0 | Re0 | Re0 | Re0/1 | Re1 | Re2 |
| Acrylic-epoxy resin | | Re0 | Re0 | Re0 | Re1 | Re1 | Re1/2 | Re2 |
| Resin, 100% solid state, 1K | XC48 AsM | Re0 | Re0 | Re1 | Re1 | Re1 | Re2 | Re3 |
| FEVE resin | | Re0 | Re0 | Re1 | Re2 | — | — | — |
| Acrylic-epoxy resin | | Re0 | Re0 | Re0 | Re1 | Re2 | — | — |
| Epoxy resin | | Re0 | Re0/1 | Re1 | Re3 | — | — | — |

The method for depositing a 100% solid state rigid mono-component polyurethane coating with initiation of curing by moisture is more protective than the rigid bi-component polyurethane and may reach 750 hours exposure with a low degree of rusting on as-machined carbon steel.

Compared with other coatings, rigid polyurethane coatings, and in particular those for which curing is initiated by moisture, exhibit superior protection against corrosion and superior passivation of the surface preparation, even without a corrosion inhibitor.

However, it should be noted that the method must be completely controlled in order to avoid the formation of bubbles during homogenization and application. Bubbles could facilitate the diffusion of electrolytes towards the interface and initiate the corrosion mechanism.

The invention claimed is:

1. A threaded tubular component, comprising at one of its ends a threaded zone arranged on an outer or inner peripheral surface depending on whether the threaded zone is a male or female end, wherein at least a portion of the male or the female end is coated with at least one dry film having a Shore D hardness of more than 50 and comprising a mono-component matrix of polyurethane and polyurea; and
a proportion of urethane functionality in the mono-component matrix of polyurethane and polyurea is at least 55% by weight with respect to urea functionality;
wherein the mono-component matrix of polyurethane and polyurea is obtained from a polyol monomer with a molecular mass in the range 300 to 6000 g/mol, a chain extension agent and free aromatic isocyanates which are optionally cured by polyaddition with moisture, and
wherein the mono-component matrix of polyurethane and polyurea comprises:
a multifunctional isocyanate pre-polymer with a functionality of at least 2, prepared from a mixture of a polyether, a polybutadiene or hydroxylated polyester polyols with a molecular mass in the range 300 to 6000 g/mol and aromatic isocyanates of diphenylmethane diisocyanate, in excess;
a co-reagent of a mono- or bis-oxazolidone to initiate reaction and dilute the pre-polymer;
an aliphatic polyisocyanate curing agent of hexamethylene diisocyanate to maintain curing;
a catalyst for the pre-polymer of dimorpholinodiethyl ether or dibutyl tin laurate;
a plasticizer to control foaming during formation of the dry film; and
a moisture scavenger to stabilize the pre-polymer during storage by capturing residual water, said moisture scavenger being p-toluene sulphonyl isocyanate, trimethyl orthoformate or trimethyl orthoacetate.

2. A threaded tubular component, comprising at one of its ends a threaded zone arranged on an outer or inner peripheral surface depending on whether the threaded zone is a male or female end,
wherein at least a portion of the male or the female end is coated with at least one dry film having a Shore D hardness of more than 50 and comprising a mono-component matrix of polyurethane and polyurea; and
a proportion of urethane functionality in the mono-component matrix of polyurethane and polyurea is at least 55% by weight with respect to urea functionality;
wherein the mono-component matrix of polyurethane and polyurea is obtained from a polyol monomer with a molecular mass in the range 300 to 6000 g/mol, a chain extension agent and free aromatic isocyanates which are optionally cured by polyaddition with moisture, and
wherein the mono-component matrix of polyurethane and polyurea comprises:
a multifunctional isocyanate pre-polymer with a functionality of at least 2, prepared from a mixture of a polyether, a polybutadiene or hydroxylated polyester polyols with a molecular mass in the range 300 to 6000 g/mol and aromatic isocyanates of diphenylmethane diisocyanate, in excess;
a co-reagent of a mono- or bis-oxazolidone to initiate reaction and dilute the pre-polymer;
an aliphatic polyisocyanate curing agent of hexamethylene diisocyanate to maintain curing;
a catalyst for the pre-polymer of dimorpholinodiethyl ether or dibutyl tin laurate;
a plasticizer to control foaming during formation of the dry film, and
a $CO_2$ scavenger of calcium oxide or magnesium oxide to control foaming and formation of bubbles during the reaction.

3. A threaded tubular component, comprising at one of its ends a threaded zone arranged on an outer or inner peripheral surface depending on whether the threaded zone is a male or female end,
wherein at least a portion of the male or the female end is coated with at least one dry film having a Shore D hardness of more than 50 and comprising a polyurethane and polyurea matrix;
a proportion of urethane functionality in the polyurethane and polyurea matrix is at least 55% by weight with respect to urea functionality, and
the polyurethane and polyurea matrix comprises at least one class 1, 2, 3 or 4 solid lubricant as a friction reducing agent, in a proportion by weight in the range 5% to 30%.

4. The threaded tubular component according to claim 3, wherein the at least one class 1, 2, 3 or 4 solid lubricant is selected from the group consisting of:
a solid lubricant from class 2 of the $Bi_2S_3$ type;
a solid lubricant from class 4 of the PTFE type; and
a combination thereof.

5. A threaded tubular component comprising at one of its ends a threaded zone arranged on an outer or inner peripheral surface depending on whether the threaded zone is a male or female end,
wherein at least a portion of the male or the female end is coated with at least one dry film having a Shore D hardness of more than 50 and comprising a polyurethane and polyurea matrix;
a proportion of urethane functionality in the matrix is at least 55% by weight with respect to urea functionality, and
the polyurethane and polyurea matrix comprises a corrosion inhibitor.

6. The threaded tubular component according to claim 1, wherein the threaded zone is entirely coated with the dry film.

7. The threaded tubular component according to claim 1, further comprising a metal/metal sealing surface coated with the dry film.

8. A threaded tubular connection, comprising a male threaded tubular component and a female threaded tubular component arranged one into the other,
wherein at least one of said threaded tubular components is the threated tubular component of claim 1.

9. A method for coating the threaded tubular component of claim 1 for drilling or working hydrocarbon wells, the method comprising:
applying the polyurethane and polyurea matrix in a liquid state to the threaded zone located at one end of the threaded tubular component by spraying over a portion of the end; and
curing the mono-component matrix of polyurethane and polyurea to form the dry film with an essentially rigid structure.

10. The method according to claim 9, wherein the curing is initiated by applying a relative humidity of at least 60% RH at a temperature of at least 20° C., optionally followed by drying.

11. The method according to claim 10, wherein the curing comprises drying in an infrared or convection drying oven supplied with water vapour.

12. The method according to claim 9, wherein the curing occurs with a bi-component spraying device including external mixing of a hardener.

13. The method according to claim 12, wherein the curing is followed by a stoving or post-curing operation at a temperature of 90° C.

14. The threaded tubular component according to claim 2, wherein the threaded zone is entirely coated with the dry film.

15. The threaded tubular component according to claim 2, comprising a metal/metal sealing surface coated with the dry film.

16. A threaded tubular connection, comprising a male threaded tubular component and a female threaded tubular component arranged one into the other,
 wherein at least one of said threaded tubular components is the threated tubular component of claim 2.

17. The threaded tubular component according to claim 3, wherein the threaded zone is entirely coated with the dry film.

18. The threaded tubular component according to claim 3, comprising a metal/metal sealing surface coated with the dry film.

19. A threaded tubular connection, comprising a male threaded tubular component and a female threaded tubular component arranged one into the other,
 wherein at least one of said threaded tubular components is the threated tubular component of claim 3.

20. The threaded tubular component according to claim 5, wherein the threaded zone is entirely coated with the dry film.

21. The threaded tubular component according to claim 5, comprising a metal/metal sealing surface coated with the dry film.

22. A threaded tubular connection, comprising a male threaded tubular component and a female threaded tubular component arranged one into the other,
 wherein at least one of said threaded tubular components is the threated tubular component of claim 5.

* * * * *